Aug. 1, 1933.  A. M. BUTLER ET AL  1,920,528
PROCESS OF RECLAIMING ELECTRIC LAMPS AND BULBS
Filed April 12, 1932   6 Sheets-Sheet 1

Inventors
ALBERT M. BUTLER
RALPH C. LANE
by Kenway & Witter
Attorneys

Aug. 1, 1933.  A. M. BUTLER ET AL  1,920,528
PROCESS OF RECLAIMING ELECTRIC LAMPS AND BULBS
Filed April 12, 1932  6 Sheets-Sheet 2

Inventors
ALBERT M. BUTLER
RALPH C. LANE
by Kenway & Witter
Attorneys

Inventors
ALBERT M. BUTLER
RALPH C. LANE
Attorneys

Patented Aug. 1, 1933

1,920,528

UNITED STATES PATENT OFFICE 1,920,528

PROCESS OF RECLAIMING ELECTRIC LAMPS AND BULBS

Albert M. Butler and Ralph C. Lane, Danvers, Mass., assignors, by mesne assignments, to Electric Lamp Patents Company, Incorporated, New York, N. Y., a Corporation of New York Application April 12, 1932. Serial No. 604,726

15 Claims. (Cl. 176—7)

This invention relates to the reclaiming of the bulbs of burned-out electric lamps and to the rebuilding of such lamps. It is well known that when the filament of an incandescent lamp has become broken, the lamp is useless unless the filament can be replaced and, except for some rather crude replacing operations which have been attempted with indifferent success, the very large number of burned-out lamps have heretofore been thrown away as a complete loss. This represents a serious and unnecessary economic waste, particularly so since failure of the filament in no way impairs the bulb. The primary object of our invention is to make available a new and improved proces for reclaiming and rebuilding these lamps, whereby they are rendered substantially of the same appearance and serviceability as when originally constructed.

We are aware that attempts have been made to "refill" or "renew" burned-out electric lamps, as by piercing the bulb and inserting a new filament, or by cutting the bulb apart at the neck, inserting a new filament and sealing the bulb together. These processes have, however, been generally limited to tipped bulbs, wherein the bulb can be exhausted at the tip end, since in applying the processes to base-exhausted bulbs, it has been necessary to seal a tube into the bulb for re-exhausting the same. Both of these processes are extremely crude and have resulted in a second-hand product whose appearance immediately marks it as a used and remade lamp. Our invention herein comprises a new process of so treating burned-out electric lamps as to produce a finished product which is substantially the same in quality and appearance as was the original product.

Our invention contemplates first the reclaiming of the bulb of the burned-out lamp in such condition that it may be used in the constructing of a new lamp which is substantially a duplicate of the original. In proceeding with our process, we preferably disassemble the burned-out lamp by first removing the base and thereafter removing the old mount, leaving sufficient of the bulb neck to provide a sealing-in support for a new mount. However, in lamps having sufficient length of neck, it may be possible to carry out our process without removing the base, all as hereinafter described. The bulb as reclaimed must not only have sufficient neck to receive the new mount but the neck must be of a shape and size properly to receive the mount therein and comprise sufficient material to form a sealing support with and for the new mount. In accordance with our invention, all these requirements have been given careful consideration and the several steps of our improved process are such as to produce a reclaimed bulb of the nature stated and to produce a rebuilt lamp thereby which is substantially a duplicate of the lamp as originally constructed. The steps whereby the bulb neck is shaped to the proper size and configuration to receive the new mount may be in the nature of a reshaping or reaming operation after the old mount has been removed, or may be in the nature of a reshaping by air pressure during the removing of the old mount, all of which is hereinafter fully described.

The treating of short necked lamps in accordance with our invention requires that a portion of the bulb neck beneath the base shall be reclaimed to provide sufficient sealing-in material to receive and support the new mount. We therefore first remove the base and then cut off the bulb beneath the base portion in a manner permitting the removal of the old mount. This operation may be performed in different ways, as hereinafter described, and when performing the same with a flame which renders the glass plastic, the exhaust tip of the bulb is previously broken to prevent collapsing or caving-in of the heated neck. It may also be desirable or necessary somewhat to lengthen this base-receiving portion of the bulb and one phase of our invention contemplates a stretching of the bulb neck while in its heated and plastic condition. This operation gives an added length to the bulb neck, and serves to aid the cutting-off operation by a thinning of the neck wall, and finally results in the production of a finished lamp having the interior chamber thereof and its relation to the elements therein of proportions equal and corresponding to those of the original lamp. In some cases we also prefer to perform the cutting-off operation with a hotter flame than is used in the stretching operation, thus performing a quicker and cleaner cut. Another phase of the operation furthermore preferably includes the use of a blast of air directed outwardly against the heated bulb neck for preventing its collapse and for reshaping it to the desired contour to receive a new mount thereinto, thereby eliminating any further necessity for reshaping the bulb. A process of thus reclaiming a used lamp bulb and producing an improved rebuilt lamp, embodying these and other steps as hereinafter more fully described, comprises a further object of our invention.

The final steps of our process include the sealing-in of a new mount within the reclaimed bulb, These steps comprise the proper locating of the mount within the bulb and the molding and sealing of the bulb neck thereonto by a novel action of heating flames, all as hereinafter described. The lamp is thereafter completed by exhausting and sealing the bulb and mounting a base thereonto.

These and other features of the invention will be best understood and appreciated from the following description of a preferred manner in which it may be carried out, together with mechanism suitable for the purpose as shown in the accompanying drawings, in which

Fig. 31 illustrates the result of a modified form of operation;

While, as has been heretofore stated, it may be possible with some types of bulbs to carry out our process without removing the base from the bulb, this step is essential with some bulbs and is believed to be preferable in the treatment of all forms of bulbs. We shall, therefore, herein illustrate and describe our process as embodying this step. We have also preferred, for the sake of clarity, to illustrate briefly in the accompanying drawings certain of the mechanism which we may use in carrying out our improved process but it will be understood that the invention is not limited to any particular mechanism.

Figure 1:
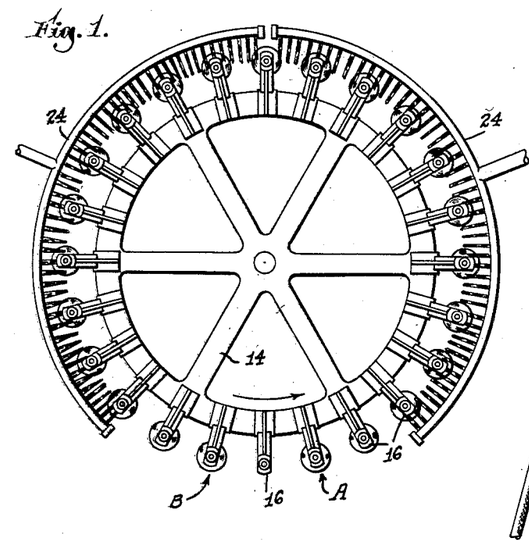
Fig. 1 is a plan view of a debasing reel for heating the base portions of electric lamps.

The first step of our process, as illustrated, comprises the removing of the base 10 from the bulb 12 of a burned-out lamp. This operation is performed by heating the base to loosen the bonding cement between the base and bulb. A convenient means for serving this purpose is a debasing reel 14 carrying a plurality of outwardly extending brackets 16. One arm of each bracket has a holder 18 for receiving the base 10 and the other arm carries a plunger 20 having a spring 22 for holding the lamp in its uppermost position with the base located in the holder. The lamps are loaded at A, from whence they pass through a plurality of heating flames from gas burners 24, and are finally unloaded at B.

Figure 2:
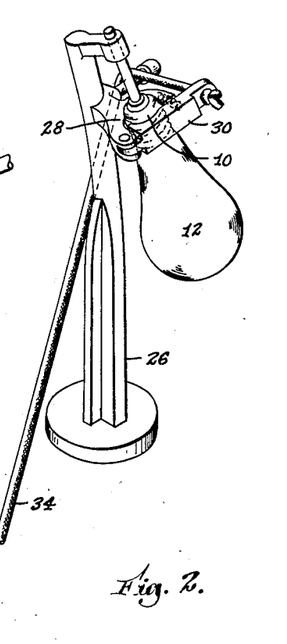
Fig. 2 is a perspective view of a base removing clamp.
Figure 3:
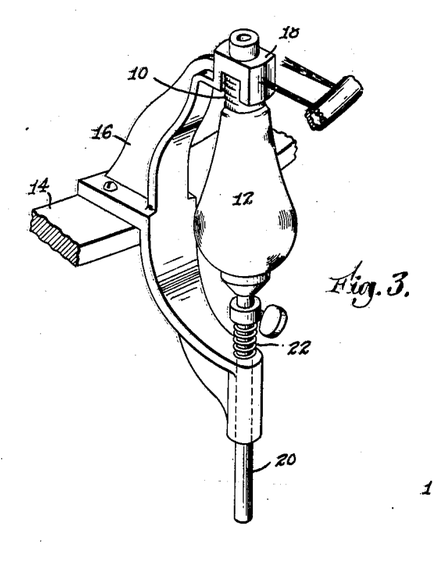
Fig. 3 is an enlarged fragmentary view of a portion of the reel shown in Fig. 1.
Figure 4:
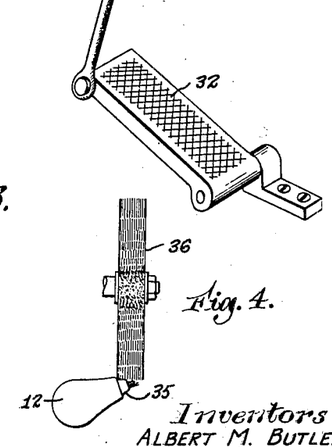
Fig. 4 illustrates the buffing of the base portion of a lamp bulb.

The heated bases may be removed by any convenient means, as by the clamping device shown in Fig. 2. This device comprises a pedestal 26 supporting a fixed jaw 28 and a pivoted jaw 30. A foot treadle 32 and connection 34 therefrom are provided for moving the pivoted jaw toward the fixed jaw and gripping the base portion of a lamp therebetween. When thus held, the bulb may be easily removed from the base. The base portion 35 of the bulb is then preferably buffed, as by a wheel 36, to remove all cement therefrom, it being understood that any such cement would interfere with the treating operations hereinafter described.

Figures 5, 6, 7, 8:
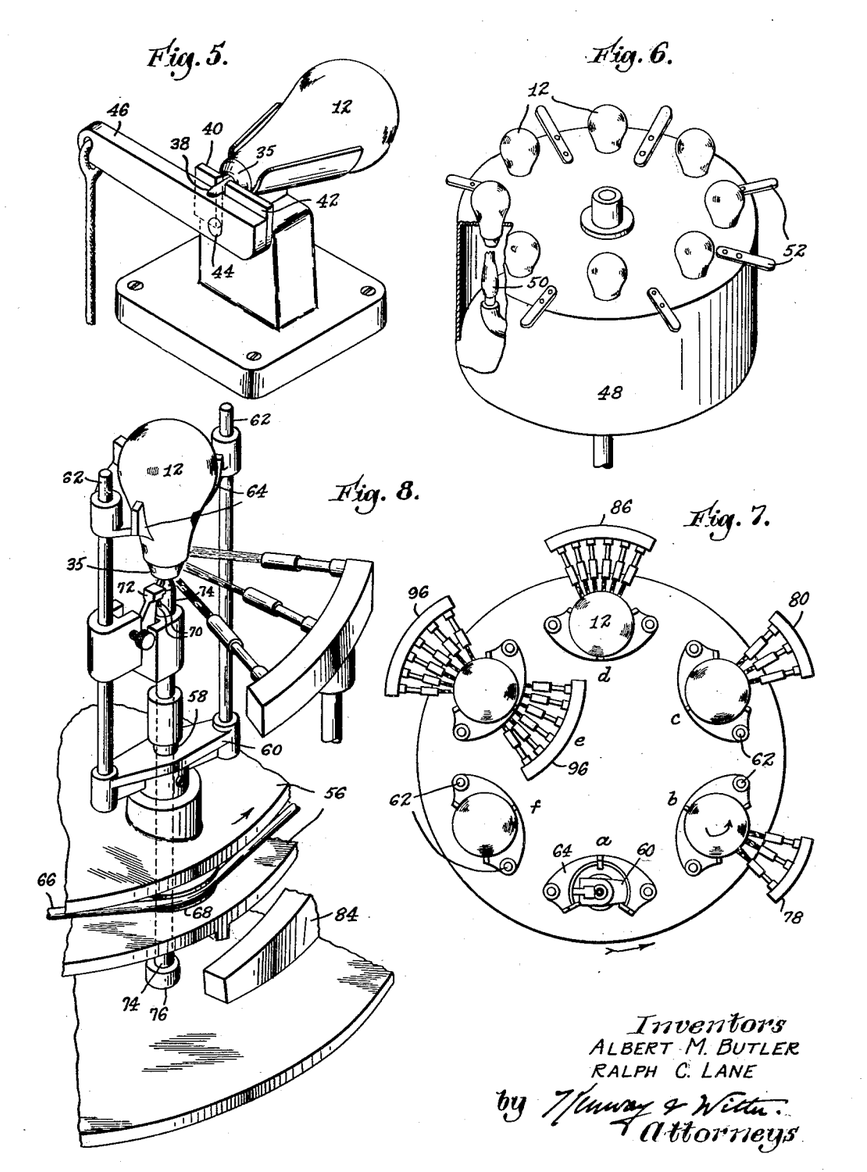
Fig. 5 is a perspective view of a tip breaking device.
Fig. 6 illustrates a pre-heater for the bulbs.
Fig. 7 is a plan view of a mount removing reel.
Fig. 8 is an enlarged fragmentary view of a portion of Fig. 7.

The treatment now to be described includes the heating of the base portion of the bulb for various purposes and the bulb must first be devacuumized in order to prevent its collapse when heated. This operation is performed by breaking the sealing-off tip 38, as by means of the device shown in Fig. 5, wherein a fixed jaw 40 cooperates with a movable jaw 42 pivoted at 44. The tip is placed between the jaws and depressing of the lever 46 breaks the tip and permits the inward passage of air into the bulb. The bulbs are then placed in a pre-heater, comprising a hood 48 having flames 50 beneath the bulb receiving openings therein. The hood can be rotated by handles 52 to bring the heated bulbs progressively to the operator. The bulbs are thus prepared for the following treatment.

Figure 12:
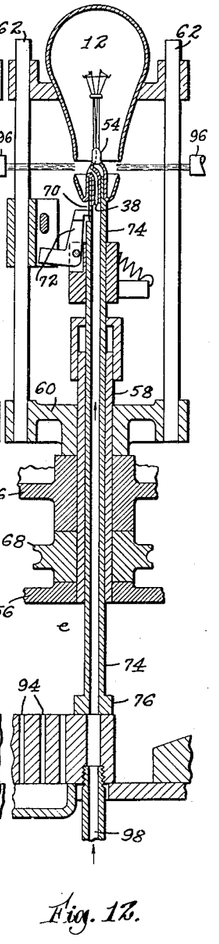
Fig. 12 is a vertical sectional view through the device at station $e$.

The steps now to be described comprise a heating of the base portion 35 of the bulb for the purpose of (1) stretching the same to lengthen somewhat the neck of the bulb, and (2) cutting off that portion which supports the mount 54 within the bulb. These operations are best described by illustrating a portion of the apparatus which may be used in the treatment. The reel shown in Fig. 7 comprises a pair of plates 56 mounted to rotate on a centrally disposed vertical axis and carrying six vertically extending tubular shafts 58 (Fig. 12). On each shaft is mounted a cross arm 60 carrying a pair of vertically extending rods 62 on which is a bulb supporting bracket or member 64. Means is provided for rotating intermittently the reel the distance between adjacent stations in the direction of the arrow (Fig. 7) and a belt 66, engaging pulleys 68, is adapted to rotate continuously the shafts 58 and the bulbs supported by the members 64. The bulbs, preheated at 50, are loaded at station a as follows. The operator places the bulb downwardly to rest on the members 64 and clamps the lead-in wires 70 between a pivoted jaw 72 and a flattened portion of a tubular plunger 74 extending downwardly through the shaft 58. The plunger 74 is freely slidable within the shaft 58 and its weight places a downward pull on the mount within the bulb, the plunger not being supported at its bottom end 76 at stations, a, b and c.

The first rotative step of the reel carries the bulb loaded at station a to station b, where a gas burner 78 plays a plurality of flames lightly onto the base portion 35 in a zone of appreciable width, the heat thereof being equally distributed since the bulb is in continuous rotation. The next rotary step of the reel carries the bulb to station c, where a similar burner 80 continues the heating operation. The operations performed at station b and c may be termed preliminary heatings, these heatings not softening the glass sufficiently to permit the plunger 74 to drop. At station d the plunger head 76 is located directly above the highest portion 82 of a track 84, and the heating by a larger number of burners 86 at this station so softens the glass that the plunger drops onto the track portion 82, with the result that the neck portion 35 of the bulb is stretched at 87 and the heated zone in the glass substantially widened. Upon the next rotative step of the reel, the plunger head 76 drops down onto a lower portion 88 of the track and further stretches the base portion of the bulb, as shown at 90. Upon leaving the station d, the stretched and softened portion 90 of the bulb is relatively thin and thereafter we provide a relatively light pressure of air within the bulb to prevent collapsing of this thinned wall and somewhat to force the same outwardly. It will be noted that the upper end fo the tubular plunger 74 engages over the broken tip 38 of the bulb and, during the travel of the bulb from station d to station e (Fig. 11), air pressure is supplied thereto from a manifold 92 and a series of relatively small air ports 94 which come into register with the plunger 74 during this travel.

Figure 13:
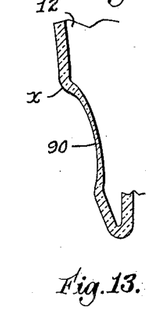
Figs. 13, 14 and 15 illustrate the steps of the operation performed at station $e$.
Figures 14, 15:
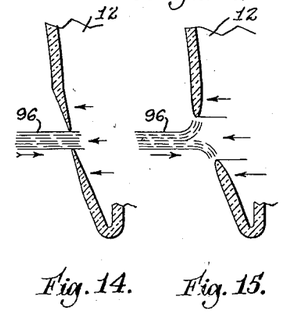

Upon arriving at station e, the relatively thin heated zone 90 of the bulb is acted upon by a plurality of relatively fine and hot flames from oppositely disposed burners 96 and simultaneously therewith the plunger 74 comes into register with a larger air port 98. The intense flames acting within the already heated zone serve to sever or cut the bulb in a manner freeing that portion which supports the mount 54. During this operation, a higher air pressure is provided within the bulb from the port 98 and this pressure serves to force the severed end portion of the bulb outwardly. These steps are particularly illustrated in Figs. 13, 14 and 15, wherein Fig. 13 illustrates the bulb as it arrives at station e, Fig. 14 illustrates the cutting action of the flames and the straightening action of the air pressure, and Fig. 15 illustrates the annealing and thickening of the bulb end following the cutting operation. It will be noted that these steps of our treatment have (1) eliminated the shoulder x on the bulb (Fig. 13), (2) reclaimed and somewhat lengthened a portion of the base portion 35 of the bulb, and (3) left the open end of the bulb in a condition for receiving a new mount thereinto and making a full and substantial seal therewith.

Upon the next rotary step of the reel, the plunger 74 drops off the track 84, thus further removing the mount from the bulb. At the station f, the bulb and old mount are removed, leaving the device ready to receive another bulb at the loading station a.

Figures 16, 17, 18, 19, 20, 21, 22:
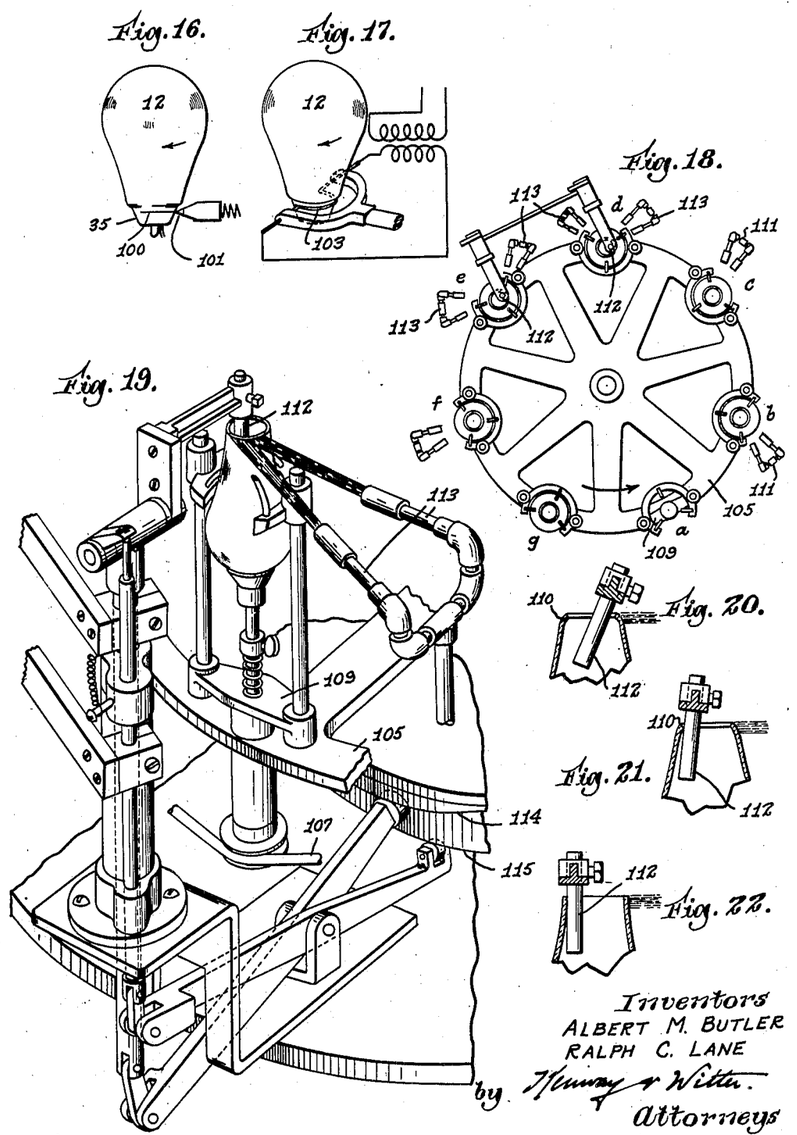
Figs. 16 and 17 illustrate a modified method of removing the mount from a bulb.
Fig. 18 is a plan view of a bulb reaming or reshaping reel.
Fig. 19 is a fragmentary view of a portion of Fig. 18.
Figs. 20, 21 and 22 illustrate the operations performed on the bulbs in Fig. 18.

While the procedure above described ordinarily leaves the bulbs in condition for receiving new mounts thereinto, it occasionally happens that a bulb will come through wherein the neck portion has not been sufficiently opened to receive a new mount as, for example, the bulb shown in Fig. 20. In such case, the bulb neck must be reshaped to correct this deficiency. It will also be understood that our process may embody merely the severing of the bulb around its base portion 35, without the use of air pressure, and follow the severing operation with a reshaping of the open neck to receive the new mount. Such severing may be performed by cutting flames or otherwise, as in the manner illustrated in Figs. 16 and 17. In these figures, the base portion 35 of the bulb is scratched therearound on a line 100 by a diamond 101 and heat, thereafter applied to the line as by an electrically heated wire 103, serves to cut or break off from the bulb that portion of the bulb neck which supports the mount within the bulb. The resulting bulb is substantially as illustrated in Fig. 20.

In Figs. 18–22, we have illustrated the part of our process whereby we reshape or enlarge the open neck end of bulbs of the above stated nature so that they may receive new mounts thereinto. This operation may be conveniently performed on a reel 105 having means, including a belt 107 and carriers 109, for supporting and rotating continuously a plurality of bulbs with the open ends uppermost. The reel is intermittently rotated to bring the bulbs to the various stations a to g inclusive, a being the loading station and g being the unloading station. At stations b and c, the shouldered neck portion 110 of the bulb is heated by burners 111. At stations d and e, shaping tools 112 are extended into the bulbs and then moved against the neck walls in a manner reshaping the walls outwardly as the bulbs rotate, other heating burners 113 being provided at these stations. The tools are moved outwardly in progressive steps whereby to reshape gradually the necks, as illustrated in Figs. 20, 21 and 22, it being understood that the tool at the station d performs the preliminary shaping, whereas the tool at station e completes the operation. As illustrated in Fig. 19, the tools are automatically given their several movements synchronously with the operation of the reel by means of cams 114 and 115 and mechanism operated thereby. The result of this operation is shown in Fig. 22, wherein the bulb neck has been properly reshaped to receive a new mount thereinto.

Figures 29, 30, 32, 33:
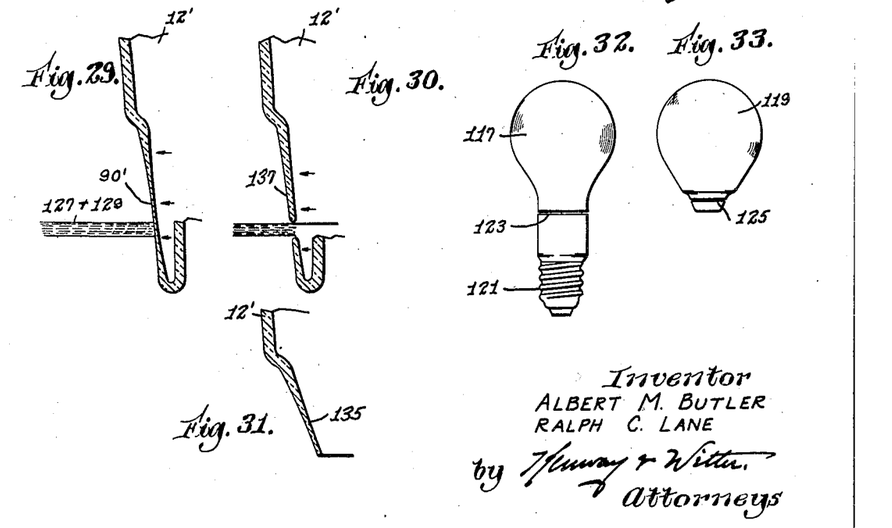
Figs. 32 and 33 illustrate two extreme types of bulbs, both of which may be reclaimed by our process.

It will be understood that our process is applicable to the treatment of bulbs which vary considerably in shape as, for example, the bulbs 117 and 119 shown in Figs. 32 and 33, the former having a relatively long neck and the latter having a very short neck. The former may be treated by various forms of our process, even without removing the base 121, by severing the neck at 123. The resulting bulb may thereafter be treated in like manner as the bulb shown in Fig. 12 and as hereinafter described to produce the final lamp of Fig. 42. In treating the bulb 119, however, it is essential that the cutting-off operation shall be performed at a point 125 closely adjacent to the seal with the mount and the neck be so stretched as to leave the reclaimed bulb with a neck of a length substantially equal to that of the original bulb. This operation requires special treatment, which is adequately provided by the following-described modified form of our process, wherein hotter and finer heating flames are used for the cutting-off operation than are used in the stretching operation. The steps of this treatment and a portion of the mechanism which may be employed are illustrated in Figs. 23-30 inclusive.

Figures 9, 10:
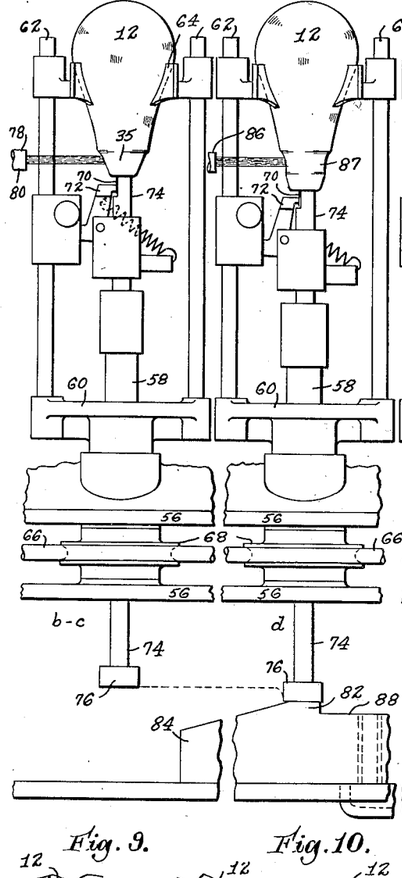
Fig. 9 is an elevation of the devices at stations $b$ and $c$ of Fig. 7.
Fig. 10 is a like elevation of the device at station $d$.
Figure 11:
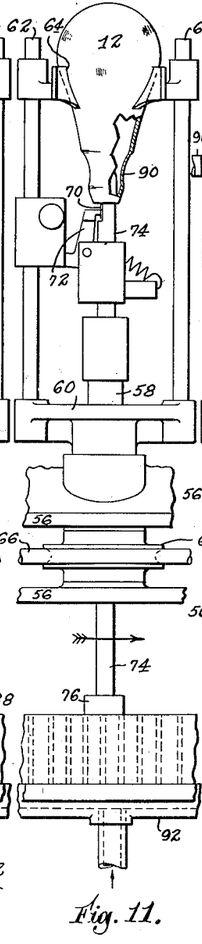
Fig. 11 is a like elevation of the bulb holding device traveling between stations $d$ and $e$.
Figures 23, 24, 25, 26, 27, 28:
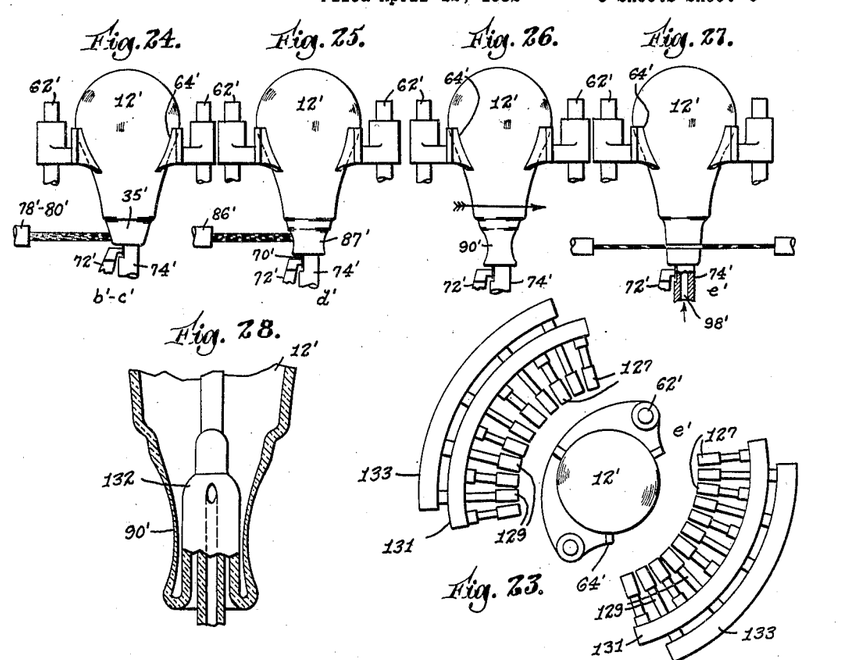
Fig. 23 is a plan view of one station of a mount removing reel similar to the station $e$ of Fig. 7.
Figs. 24, 25 and 26 illustrate operations similar to the operations shown in Figs. 9, 10 and 11.
Fig. 27 is a like view of an operation performed at the station shown in Fig. 23.
Figs. 28, 29 and 30 illustrate the steps of the operation performed at the station shown in Fig. 23.

This treatment is preferably performed on a reel similar to that shown in Fig. 7, and the operations performed at stations $a$, $b$, $c$, $d$ and $f$ are the same as heretofore described in connection with Fig. 7. the steps illustrated in Figs. 24, 25 and 26 being substantially the same as those illustrated in Figs. 9, 10 and 11 and the parts therein being indicated by the same reference characters primed. The neck portion of the bulb is preheated at stations $b'$ and $c'$, is further heated and stretched at station $d'$, and is further stretched during the travel of the bulb to station $e'$ (Figs. 23 and 27), as illustrated in Fig. 26. Oppositely disposed burners provided at station $e'$ each comprises a plurality of alternately arranged jets 127 and 129, both supplied with gas from a manifold 131. The jets 127 are similar to the jets at station $d'$ and their function is to keep the bulb neck hot and plastic during the final cutting-off and annealing steps. The jets 129 are relatively finer and are directed onto the neck at a point closely adjacent to its sealing contact with the mount 132 within the bulb. These jets are also supplied with oxygen from a manifold 133 rearwardly of the manifold 131, all the jets normally functioning from the manifold 131 and the oxygen being turned on from the manifold 133 only during the cutting-off operation.

The operations which take place at station $e'$ (Figs. 23 and 27) are illustrated in Figs. 28, 29 and 30. The bulb, with its neck stretched at 90', arrives at station $e'$ in the condition shown in Fig. 28. The jets 127 and 129 immediately play thereonto and oxygen is supplied to the jets 129 to provide a plurality of hot needle-like flames which quickly sever the wall. The oxygen is thereafter turned off and all the burners held at a relatively low point to provide soft annealing flames. During these operations, air is supplied to the bulb through the tube 98', as heretofore described, and the air pressure thus produced within the bulb expands the neck wall outwardly, as illustrated in Figs. 29 and 30, the annealing step permitting the cut end of the bulb somewhat to thicken to the shape shown in Fig. 30. The neck of the bulb as thus completed is sufficiently long and large to receive a new mount thereinto, as hereinafter described. In Fig. 31, we have illustrated the shape which the bulb neck would assume except for the air pressure within the bulb. The relatively small opening provided by the inwardly projecting neck portion 135 would require an expanding operation before receiving a new mount thereinto, whereas our improved process leaves the neck portion 137 in finished condition.

As has been heretofore stated, one of the objects of our invention is to produce a rebuilt lamp which is substantially a duplicate of the originally constructed lamp and having substantially the same overall length and interior proportions. We have above described that portion of our process whereby we reclaim the bulbs of burned-out lamps to this end and we will now describe the sealing-in of new mounts within such bulbs whereby to produce our improved rebuilt lamps. This portion of the process is illustrated in Figs. 34-40 of the drawings.

The sealing-in operation may be conveniently performed on a reel 141, similar to the reel shown in Fig. 7. Members 143 on the reel are adapted to hold a plurality of bulbs with the open ends downward, and means is provided for continuously rotating the bulbs. The reel is intermittently rotated to bring the bulbs from a loading station $a$ progressively to stations $b$ to $h$ inclusive. A tubular plunger 145, normally resting on a stop 147 beneath each pair of arms, is provided for supporting a mount 149 to be sealed into the bulb. The operations performed are illustrated by the devices shown in elevation in Figs. 35-40 inclusive.

Figures 34, 35, 36, 37, 38, 39, 40, 41, 42:
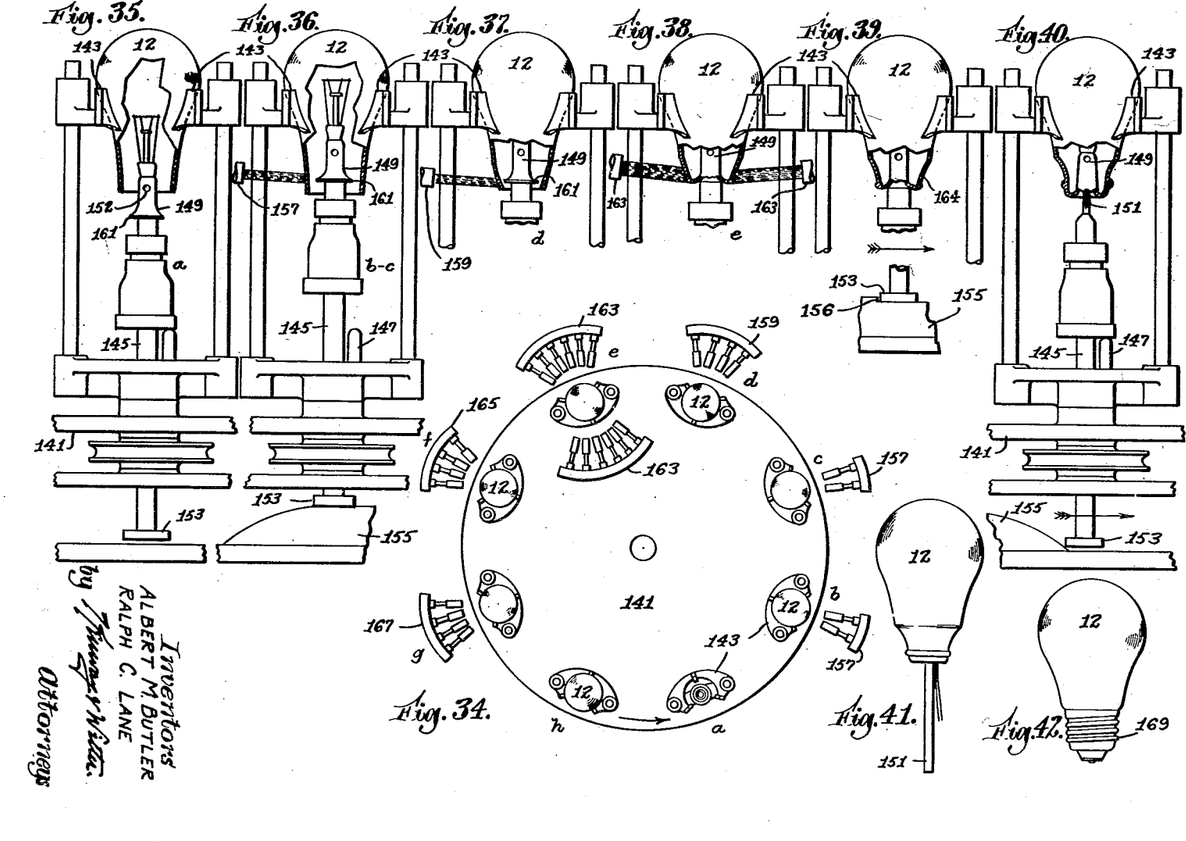
Fig. 34 is a plan view of a sealing-in reel.
Figs. 35 to 38 inclusive are views of the bulb in side elevation respectively at stations $a$, $b$—$c$, $d$ and $e$ of Fig. 34.
Figs. 39 and 40 are like views showing the bulb between stations $e$ and $f$ and stations $g$ and $h$ respectively.
Fig. 41 is a side elevation of a bulb and mount as completed by the steps of the process shown in Figs. 35–40.
Fig. 42 illustrates a finished lamp as rebuilt by our novel process.

A mount and bulb are loaded in each device while at the station $a$, the exhaust tube or stem 151 of the mount being dropped into the plunger 145 and the bulb being placed over the mount and supported on the members 143, as shown in Fig. 35. Upon the first rotary step of the reel, the bottom end 153 of the plunger rides onto a track 155 and raises and supports the mount to the proper elevation within the bulb whereby the filament is located in the same position as was the filament in the original lamp. The neck of the bulb is preheated at stations $b$ and $c$ by burners 157. A stronger heating is provided by a burner 159 at station $d$ and the flames thereof are so directed forcibly against the end of the bulb as to cause the same to be bent or molded inwardly toward the flare 161 of the mount, as illustrated in Fig. 37, the completion of this step serving to bring the bulb end and flare substantially into contact. A much greater heat is provided by oppositely disposed burners 163 at station $e$ and the flames of these burners are so directed as to mold and complete the seal of the bulb end and flare substantially as shown in Fig. 38, and the base-receiving portion of the bulb neck is sufficiently heated at this station to prepare it for the shaping operation following the movement of the bulb from station $e$ and illustrated in Fig. 39. Upon movement of the bulb from station $e$, the plunger end 153 drops off the track step 156, shown in Fig. 39, and causes a stretching and shaping of the base-receiving portion 164 of the bulb neck. This operation not only shapes this portion of the bulb to receive the base 169 but also serves to relieve strain placed on the bulb neck in the heating and shaping operations.

A relatively lighter heat is provided by burners 165 and 167 at stations $f$ and $g$, the function of the burner 165 being to anneal the sealed end of the lamp and the more particular function of the burner 167 being to heat the extreme end of the lamp to render it adaptable to the pulling-down operation next to be performed, the flame from the burner 167 extending somewhat upwardly into the flare end of the lamp. The final operation is performed on the bulb as the reel moves it from the station $g$. At this time the end 153 of the plunger rides off the track and the weight of the plunger, which plunger is gripped onto the stem 151, causes the heated seal to be drawn downwardly or outwardly of the bulb, as shown in Fig. 40. This operation serves to relieve the strain on the seal but does not affect the cooled base-receiving portion 164 of the neck which was shaped in a previously described operation. The lamp is thereafter exhausted through the stem 151 which opens into the bulb through the flare at 152 (Fig. 35), and the stem is then sealed off and the base 169 applied. The resulting lamp, shown in Fig. 42, is substantially a duplicate of the lamp as originally constructed, it being clear that the bringing of the proportions of the finished lamp to correspond to those of the original lamp is made possible by the stretching of the bulb neck whereby the bulb is lengthened and its interior chamber is enlarged.

Having thus described our invention, what we claim as new and desire to secure by Letters Patent is:

1. A method of reclaiming the bulbs of burned-out electric lamps, consisting of removing the base from the bulb, breaking the exhaust tube thereinto, heating to a plastic condition a portion of the bulb neck adjacent to its end, thinning said portion by a separating movement of the bulb at opposite sides thereof, cutting said thinned portion apart by the application of a flame thereto, and thereafter removing the mount from the bulb.

2. A method of reclaiming the bulbs of burned-out electric lamps, consisting of cutting off from the bulb by the application of heat that portion of the bulb neck which supports the mount within the bulb, removing the burned-out mount, and shaping the neck end of the bulb to receive a new mount while in a heated plastic condition.

3. A method of reclaiming the bulbs of burned-out electric lamps, consisting of moderately heating the neck portion of the bulb in a zone adjacent to its end, thinning the heated neck wall by stretching the same longitudinally of the bulb, cutting off from the bulb that portion of the bulb neck which supports the mount within the bulb by applying within said heated zone flames of intense heat, thereafter annealing the open end of the bulb by the application of a flame of moderate heat, and removing the burned-out mount.

4. A method of reclaiming burned-out electric lamps, consisting of cutting off from the bulb, by the application of heat to the bulb neck, that portion of the bulb neck which supports the mount within the bulb, removing the burned-out mount, softening the neck end of the bulb by the application of heat and reshaping the same to receive a new mount, and thereafter inserting a new mount into the bulb and supporting the same therein by closing and sealing the bulb neck thereonto.

5. A method of reclaiming burned-out electric lamps, consisting of removing the base from the bulb, cutting off from the bulb, on a line located beneath the base before its removal from the bulb, that portion of the bulb neck which supports the mount within the bulb, removing the burned-out mount, and thereafter inserting a new mount into the bulb and supporting the same therein by closing and sealing the bulb neck thereonto.

6. A method of reclaiming burned-out electric lamps, consists of removing the base from the bulb, cutting off from the bulb, by the application of heat to the inwardly tapering portion of the bulb neck end located beneath the base before its removal from the bulb, that portion of the bulb neck which supports the mount within the bulb, forcing the heated end of the bulb outwardly to enlarge the opening therein sufficiently to receive a new mount, removing the burned-out mount, and thereafter inserting a new mount into the bulb and supporting the same therein by closing and sealing the bulb neck thereonto.

7. A method of reclaiming burned-out electric lamps, consisting of removing the base from the bulb, cutting off from the bulb, by the application of heat to the inwardly tapering portion of the bulb neck end located beneath the base before its removal from the bulb, that portion of the bulb neck which supports the mount within the bulb, removing the burned-out mount, heating the open end of the bulb to a plastic condition and expanding it outwardly to enlarge the opening, and thereafter inserting a new mount into the bulb and supporting the same therein by closing and sealing the bulb neck thereonto.

8. A method of reclaiming burned-out electric lamps, consisting of removing the base from the bulb, cutting off from the bulb, by the application of heat to the inwardly tapering portion of the bulb neck end located beneath the base before its removal from the bulb, that portion of the bulb neck which supports the mount within the bulb, forcing the heated end of the bulb outwardly to enlarge the opening therein sufficiently to receive a new mount by providing a pressure of air outwardly against the heated walls thereof, removing the burned-out mount, and thereafter inserting a new mount into the bulb and supporting the same therein by closing and sealing the bulb neck thereonto.

9. A method of reclaiming burned-out electric lamps, consisting of removing the base from the bulb, heating the neck portion of the bulb adjacent to its end, stretching the heated neck by pulling on the lead-in wires of the mount, cutting off from the bulb that portion of the bulb neck which supports the mount within the bulb, removing the burned-out mount, and thereafter inserting a new mount into the bulb and supporting the same therein by closing and sealing the bulb neck thereonto.

10. A method of reclaiming burned-out electric lamps, consisting of cutting off from the bulb that portion of the bulb neck which supports the mount within the bulb, removing the burned-out mount, inserting a new mount within the bulb, and closing, sealing and shaping the bulb neck onto the flare of the mount by the heat and pressure of flames directed against the neck adjacent to its end.

11. A method of reclaiming burned-out electric lamps, consisting of treating the bulb neck with the application of heat to free the mount therefrom and leave the open neck end of the bulb of a shape, size and length to receive and seal onto the flare of a new mount, inserting a new mount and its flare thereinto, closing and sealing the bulb neck onto the flare of the mount by the heat and pressure of flames directed against the neck adjacent to its end, and finishing the seal by pulling the mount outwardly of the bulb while the seal is in plastic condition.

12. A method of reclaiming burned-out electric lamps, consisting of removing the base from the bulb, treating with the application of heat that portion of the bulb neck which was beneath the base to free the mount therefrom and leave the open neck end of the bulb of a shape, size and length to receive and seal onto the flare of a new mount, inserting a new mount and its flare thereinto, and closing and sealing the bulb neck onto the flare of the mount by the heat and pressure of flames directed against the neck adjacent to its end.

13. A method of reclaiming the bulbs of burned-out electric lamps, consisting of heating a relatively wide annular zone in the neck portion of the bulb, thinning the wall comprising the heated zone by stretching the same longitudinally of the bulb, cutting off from the bulb that portion of the bulb neck which supports the mount within the bulb by the application of relatively narrow flames to said heated zone, and thereafter removing the burned-out mount.

14. A method of reclaiming the bulbs of burned-out electric lamps, consisting of heating with flames a relatively wide annular zone of the neck portion of the bulb, thinning the wall comprising the heated zone by stretching the same longitudinally of the bulb, cutting off from the bulb that portion of the bulb neck which supports the mount within the bulb by the application of relatively hotter flames to said heated zone, and thereafter removing the burned-out mount.

15. The method of reclaiming the bulbs of burned-out electric lamps, which consists in heating a relatively wide zone in the neck portion of the bulb closely adjacent to the mount-supporting end thereof, stretching the portion so heated to lengthen the bulb and adapt it to receive a new mount, cutting off from the bulb on a line within said heated zone that part of the bulb neck which supports the mount within the bulb, annealing the open end of the bulb by the application of relatively mild heat thereto after the cutting-off operation, and removing the burned-out mount.

ALBERT M. BUTLER.
RALPH C. LANE.